UNITED STATES PATENT OFFICE.

CHARLES G. CARROLL AND WILLIAM H. ADAMS, OF FAYETTEVILLE, ARKANSAS.

SOLDER FOR ALUMINUM AND OTHER METALS.

No. 906,383.　　　　　Specification of Letters Patent.　　　Patented Dec. 8, 1908.

Application filed November 19, 1907. Serial No. 402,913.

*To all whom it may concern:*

Be it known that we, CHARLES G. CARROLL and WILLIAM H. ADAMS, citizens of the United States, residing at Fayetteville in the county of Washington and State of Arkansas, have invented certain new and useful Improvements in Solder for Aluminum and Other Metals; and we do hereby declare the following to be a full, clear, and exact description of the invention, such as will enable others skilled in the art to which it appertains to make and use the same.

Our invention relates to certain new and useful improvements in solder adapted for uniting aluminium surfaces and in the method of producing the same.

In uniting pieces of aluminium or other metals with solder it is necessary, as is well understood, that the surfaces of the metal should be clean and free from oxids.

Our invention has for its object an alloy which shall be capable of cleansing the surfaces of aluminium or other metals from oxids and at the same time providing a filler which shall be capable of firmly uniting the surfaces to be joined.

With these ends in view our invention consists of an alloy composed of calcium and some other metal which shall have the characteristics and properties of alloying or uniting with the surfaces of the metal to be joined.

Our invention also consists in the method hereinafter described of combining the metals constituting our improved alloy or solder. An alloy which we have found especially adapted for the purpose consists of tin 47½ per cent., lead 47½ per cent. and calcium 5 per cent. The combination of the calcium with the other metals described produces an alloy whose oxid is formed with a greater evolution of heat per chemically equivalent quantities than are the oxids of aluminium or other metals to be soldered and hence is capable of reducing the oxids of the metals to be soldered through the application of heat while the filling material is capable of attaching itself securely to the surfaces to be joined. In amalgamating these metals they are to be placed in a crucible which is then sealed and heated up to the fusing point of calcium when the metals become a homogeneous alloy, which is allowed to cool to a sufficient extent, when it is cast into bars or other suitable shapes.

Instead of using both tin and lead with the calcium, tin alone may be used, or any other metal or alloy capable of joining or attaching itself to, or alloying with aluminium or other metals when the surfaces of such metals are clean or substantially free from oxids may be used in connection with the calcium.

The character of the metals used in connection with the calcium may vary accordingly as it may be desired to produce a hard or soft solder, and the proportions may likewise vary provided they be such as to produce a solder embodying sufficient calcium to successfully free the surfaces of the metal to be united from oxids, and the other metallic constituents of such character and quantity as to constitute a permanently remaining or connecting mass between the surfaces to be joined, or in the aperture to be filled. We have found however that the formula hereinbefore given produces satisfactory results.

Having described our invention what we claim as new and desire to secure by Letters Patent is—

1. A solder for aluminium and other metals that consists of calcium and some filling material, that has sufficient affinity for aluminium or other metals to join itself thereto, when said aluminium or other metals are substantially free from their metallic oxids upon the surfaces that are to be soldered, said calcium being in sufficient quantity to reduce sufficiently the oxid of said metals to be soldered, so that the binding materials will adhere thereto, substantially as described.

2. A solder for aluminium and other materials, consisting of calcium and tin, said calcium being in sufficient quantity so as to reduce the aluminium or other metallic oxids on the surfaces of the metals to be soldered as to allow of the adherence of such solder, substantially as described.

In testimony whereof, we have signed our names to this specification in the presence of two subscribing witnesses.

CHARLES G. CARROLL.
　　　　WILLIAM H. ADAMS.

Witnesses:
　F. M. POLLOCK.
　J. C. WILLIAMS.